(12) United States Patent
Kato

(10) Patent No.: US 7,508,428 B2
(45) Date of Patent: Mar. 24, 2009

(54) NOISE RESTRAINT APPARATUS FOR DIGITAL CAMERA

(75) Inventor: Tetsuaki Kato, Saitama (JP)

(73) Assignee: Hoya Corporation, Tokyo (JP)

( * ) Notice: Subject to any disclaimer, the term of this patent is extended or adjusted under 35 U.S.C. 154(b) by 556 days.

(21) Appl. No.: 10/928,187

(22) Filed: Aug. 30, 2004

(65) Prior Publication Data

US 2005/0046714 A1 Mar. 3, 2005

(30) Foreign Application Priority Data

Sep. 1, 2003 (JP) ............................ P2003-308358

(51) Int. Cl.
*H04N 5/217* (2006.01)
*H04N 3/14* (2006.01)
*H04N 5/335* (2006.01)
*H04N 5/238* (2006.01)

(52) U.S. Cl. .................... 348/241; 348/312; 348/297; 348/367

(58) Field of Classification Search ................ 348/241, 348/312, 367, 297, 362, 371
See application file for complete search history.

(56) References Cited

U.S. PATENT DOCUMENTS

| 4,589,023 | A | | 5/1986 | Suzuki et al. | |
|---|---|---|---|---|---|
| 5,027,380 | A | * | 6/1991 | Nishiki | 378/4 |
| 5,159,457 | A | * | 10/1992 | Kawabata | 348/246 |
| 6,292,220 | B1 | * | 9/2001 | Ogawa et al. | 348/312 |
| 6,798,456 | B1 | | 9/2004 | Sato | |
| 7,050,104 | B1 | * | 5/2006 | Nakayama et al. | 348/371 |
| 7,064,787 | B2 | * | 6/2006 | Kijima et al. | 348/296 |
| 7,274,391 | B2 | * | 9/2007 | Shepherd et al. | 348/243 |
| 2003/0174236 | A1 | * | 9/2003 | Sakaguchi | 348/362 |

FOREIGN PATENT DOCUMENTS

| JP | 59-132288 A | 7/1984 |
|---|---|---|
| JP | 2000-209506 | 7/2000 |
| JP | 2001-78083 | 3/2001 |
| JP | 2001-78084 | 3/2001 |
| JP | 2003-046860 A | 2/2003 |

OTHER PUBLICATIONS

English language Abstract of JP 2003-046860 A.
English language Abstract of JP 59-132288 A.
English language Abstract of JP 2000-209506.
U.S. Appl. No. 10/928,163 to Kato.

* cited by examiner

*Primary Examiner*—Sinh N Tran
*Assistant Examiner*—Christopher K Peterson
(74) *Attorney, Agent, or Firm*—Greenblum & Bernstein, P.L.C.

(57) ABSTRACT

A noise restraint apparatus for a digital camera which has an imaging device for imaging a photographic subject, comprises an outputting processor and a controlling processor. The outputting processor outputs a vertical synchronous signal to the imaging device. The controlling processor controls an output cycle with which the outputting processor outputs the vertical synchronous signal. The output cycle has a first cycle, for a first period which is the period before an exposure operation, in which a photographic subject is imaged by the imaging device, and a second cycle which is longer than the first cycle, for a second period, while the exposure operation is performed.

13 Claims, 3 Drawing Sheets

NOISE RESTRAINT APPARATUS FOR DIGITAL CAMERA

BACKGROUND OF THE INVENTION

1. Field of the Invention

The present invention relates to a noise restraint apparatus for a digital camera, and in particular to noise restraint in long time exposure operations such as night-view imaging and astrophotography imaging.

2. Description of the Related Art

When a long time exposure operation is carried out in a digital camera which has an imaging device such as a CCD, there is a problem that a dark output by a certain picture element of the imaging device, becomes bigger than that of other picture elements due to the influence of the dispersion of dark current in each picture element on the imaging device, so that the dark output by a certain picture element turns out as a bright point in a dark area on the image.

Even for an optical black output, which is obtained when a partly shaded CCD is used, the dark current component is not able to be cut and removed, so that an image having generally increased brightness and damaged image quality is obtained.

Japanese unexamined patent publication (KOKAI) No. 2001-78084 discloses a noise detecting apparatus that detects the temperature of the CCD which rises due to continuous use, and warns the operator of the possibility that the dark current might influence the image, when the temperature of the CCD rises above a standard temperature. This is the usual method of detecting fixed pattern noise due to dispersion of dark current in each picture element.

However, the above-discussed conventional noise detecting apparatus does not restrain the occurrence of noise.

SUMMARY OF THE INVENTION

Therefore, an object of the present invention is to provide a noise restraint apparatus for a digital camera which uses an imaging device such as a CCD, that can restrain the occurrence of noise by reducing the influence of the dark current caused by continuous use of the CCD.

According to the present invention, a noise restraint apparatus for a digital camera which has an imaging device for imaging a photographic subject, comprises an outputting processor and a controlling processor.

The outputting processor outputs a vertical synchronous signal to the imaging device.

The controlling processor controls an output cycle with which the outputting processor outputs the vertical synchronous signal.

The output cycle has a first cycle, for a first period which is the period before an exposure operation, in which a photographic subject is imaged by the imaging device, and a second cycle which is longer than the first cycle, for a second period, while the exposure operation is performed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
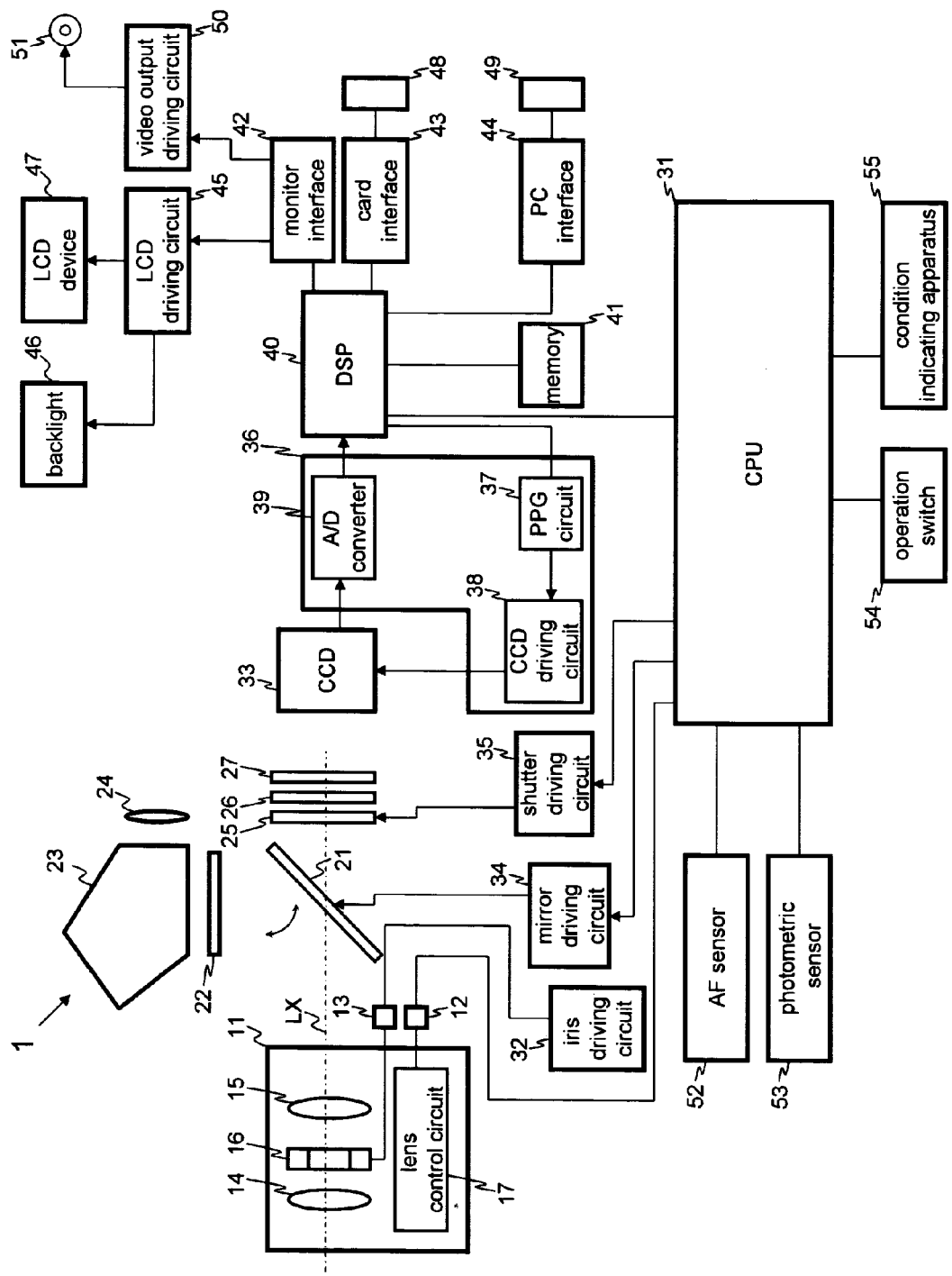
FIG. 1 is a block diagram of the digital camera of this embodiment.

The present invention is described below with reference to the embodiments shown in the drawings. FIG. 1 shows a block diagram of a digital camera of this embodiment.

The digital camera 1 which is a single-lens reflex camera, having mount pins 12 and 13, a CPU 31, and an iris driving circuit 32. An interchangeable lens 11 is connected with electric circuits of the digital camera 1, through the mount pins 12 and 13. A lens barrel of the interchangeable lens 11 has a front lens 14, a rear lens 15, an iris 16, and a lens control circuit 17. The iris 16 is set between the front lens 14 and the rear lens 15. Focusing is carried out by moving the front and rear lenses 14 and 15 along an optical axis LX and is controlled by the lens control circuit 17. The lens control circuit 17 is controlled by control signals which are transmitted from the CPU 31 through the mount pin 12. The iris 16 is controlled by control signals which are transmitted from the iris driving circuit 32 through the mount pin 13, in such a way that a degree of opening of the iris 16 is adjusted. The iris driving circuit 32 is controlled by the CPU 31.

The digital camera 1 has a quick return mirror 21 in line with the optical axis LX of the front and rear lenses 14 and 15. The quick return mirror 21 can be changed between an inclined down position which is depicted, and a level up position which is above the inclined position.

The digital camera 1 has a focusing glass 22 above the quick return mirror 21 in the level condition, a pentagonal prism 23 above the focusing glass 22, and an ocular lens 24 of a view finder at the rear of the pentagonal prism 23 (the opposite side of the interchangeable lens 11).

The digital camera 1 has a shutter 25 at the rear of the quick return mirror 21, an infrared cut off filter 26 and an optical low-pass filter 27 at the rear of the shutter 25. A CCD (an imaging device) 33 is located at the rear of the optical low-pass filter 27. Accordingly, the quick return mirror 21, the shutter 25, the infrared cut off filter 26, the optical low-pass filter 27, and the CCD 33 are in line with the optical axis LX of the front and rear lenses 14 and 15.

The digital camera 1 has a mirror driving circuit 34 and a shutter driving circuit 35. The rotation of the quick return mirror 21 is driven by the mirror driving circuit 34. The opening and closing action of the shutter 25 is driven by the shutter driving circuit 35. Further, the mirror driving circuit 34 and the shutter driving circuit 35 are controlled by the CPU 31.

The quick return mirror 21 is usually in the inclined position, so that the light which enters the changeable lens 11 is guided to the pentagonal prism 23 by the quick return mirror 21. At this time, the shutter 25 is closed, so that the light path toward the CCD 33 from the changeable lens 11 is blocked by the shutter 25.

During the imaging process, the quick return mirror 21 is rotated upward by the mirror control circuit 34, so that the quick return mirror 21 is leveled. The shutter 25 is opened by the shutter driving circuit 35 corresponding to the rotation of the quick return mirror 21, so that the light which passes through the changeable lens 11 is guided to the light-receiving surface of the CCD 33. An image obtained through the front and rear lenses 14 and 15 is formed on the light-receiving surface of the CCD 33, so that imaging signals corresponding to the image are formed by the CCD 33.

The digital camera 1 has a DSP (Digital Signal Processor) 40, an AF (Auto Focus) sensor 52, a photometric sensor 53, an operation switch 54, and a condition indicating apparatus 55. The lens control circuit 17, the iris driving circuit 32, the DSP 40, the AF sensor 52, the photometric sensor 53, the operation switch 54, and the condition indicating apparatus 55 are connected to the CPU 31, and are controlled by the CPU 31, so that the CPU 31 controls the action of the changeable lens 11 which is mounted on the digital camera 1, and also the digital camera 1, generally.

The digital camera 1 has a PPG (Programmable Pulse Generator or Pulse Pattern Generator) circuit 37, a CCD driving circuit 38, and an A/D (Analogue/Digital) converter 39. The PPG circuit 37 is connected with the DSP 40, so that the PPG circuit 37 generates various pulse signals according to the DSP 40. The CCD driving circuit 38 is driven on the basis of these various pulse signals, so that the action of the CCD 33 is controlled by the CCD driving circuit 38. That is, the image signals which are read out from the CCD 33, are converted to digital signals by the A/D converter 39, and are subjected to specified image processes by the DSP 40.

The digital camera 1 has a memory 41 which has sufficient capacity to store the digital image data corresponding to one image of the photographic subject and is connected to the DSP 40.

An AFE (Analogue Front End) 36 is composed of the PPG circuit 37, the CCD driving circuit 38, and the A/D converter 39. The action of the AFE 36 is controlled by the DSP 40. The AFE 36 outputs a vertical synchronous signal Vd and a drive pulse for transferring electric charge to the CCD 33. The start of the exposure operation, the termination of the exposure operation, and the reading of the data obtained in the exposure operation are carried out according to the vertical synchronous signal Vd and the drive pulse for transferring electric charge.

A noise restraint apparatus relating to the present invention is composed of the CPU 31, the AFE 36, and the DSP 40. The noise restraint apparatus restrains noise caused by the pulse signals, by outputting the vertical synchronous signal Vd with two kinds of cycles every stated period.

That is to say, the noise restraint apparatus outputs the vertical synchronous signal Vd with a first cycle, for a first period which is the period before the exposure operation; with a third cycle, for a third period which is the period from after the termination of the exposure operation to before the reading in of the data obtained in the exposure operation; and with a fifth cycle, for a fifth period which is the period from after the termination of the reading of the data obtained in the exposure operation to before the next exposure operation. The first, third, and fifth cycles are short cycles (5 ms), because the response speed corresponding to the setting of the AFE 36 etc. should be high, and because the image which is indicated should be changed with a proper timing for the through image.

The noise restraint apparatus outputs the vertical synchronous signal Vd with a fourth cycle, for a fourth period, while the reading of the data obtained in the exposure operation is performed. The fourth cycle is a long cycle, so that there is sufficient time to read out the data obtained in the exposure operation for one field, and it is 168.3 ms in this embodiment.

The noise restraint apparatus outputs the vertical synchronous signal Vd with a second cycle, for a second period, while the exposure operation is performed. The value of the second cycle can be set to either value of the two kinds of cycles according to the time for the exposure operation. When the time for the exposure operation is longer than 1 second, the second cycle is set as a long cycle which is the same as the fourth cycle. However, when the time for the exposure operation is shorter than or equal to 1 second or the exposure operation is performed in the bulb exposure mode, the second cycle is set as a short cycle which is the same as the first cycle.

The digital camera 1 has a monitor interface 42, a card interface 43, and a PC interface 44. The monitor interface 42, the card interface 43, and the PC interface 44 are connected to the DSP 40 and are controlled by the DSP 40.

The digital camera 1 has an LCD (Liquid Crystal Display) driving circuit 45, a backlight 46, an LCD device 47, a card connector 48, a PC connector 49, a video output driving circuit 50, and a video output terminal 51.

The monitor interface 42 is connected with the backlight 46 and the LCD device 47 through the LCD driving circuit 45, and is connected with the video output terminal 51 through the video output circuit 50. The LCD driving circuit 45 is controlled on the basis of the image data read out from the memory 41, so that the image corresponding to the image data is indicated on the LCD device 47. The image data is converted to the specified format by the video output driving circuit 50, so that the converted image data is output to external output devices which are not depicted, through the video output terminal 51.

The card interface 43 is connected with the card connector 48, and the PC interface 44 is connected with the PC connector 49. The card connector 48 can be fixed to the IC memory card which can store image data etc. and is not depicted. The PC connector 49 can be connected to a personal computer which is not depicted.

The AF sensor 52 and the photometric sensor 53 are connected with the CPU 31. The AF sensor 52 measures the focus adjustment condition of the front and rear lenses 14 and 15. The photometric sensor 53 carries out the photometry to automatically decide the degree of opening of the iris 16 during the exposure operation and the electric charge accumulation time (the time for the exposure operation).

The operation switch 54 and the condition indicating apparatus 55 are connected with the CPU 31. The operation switch 54 has a photometric switch and a release switch etc. The digital camera 1 has a release button which is not depicted. The photometric switch is turned to the on state when the release button is half way depressed. When the photometric switch is in the on state, the photometry is carried out by the photometric sensor 53. The shutter release switch is tuned to the on state when the release button is fully depressed. And, the shutter 25 is opened and closed, so that the CCD 33 is exposed, and the CCD 33 generates imaging signals corresponding to the image of the photographic subject. The setting indicating apparatus 55 has an LCD device which indicates the various settings of the digital camera 1.

Figure 2:
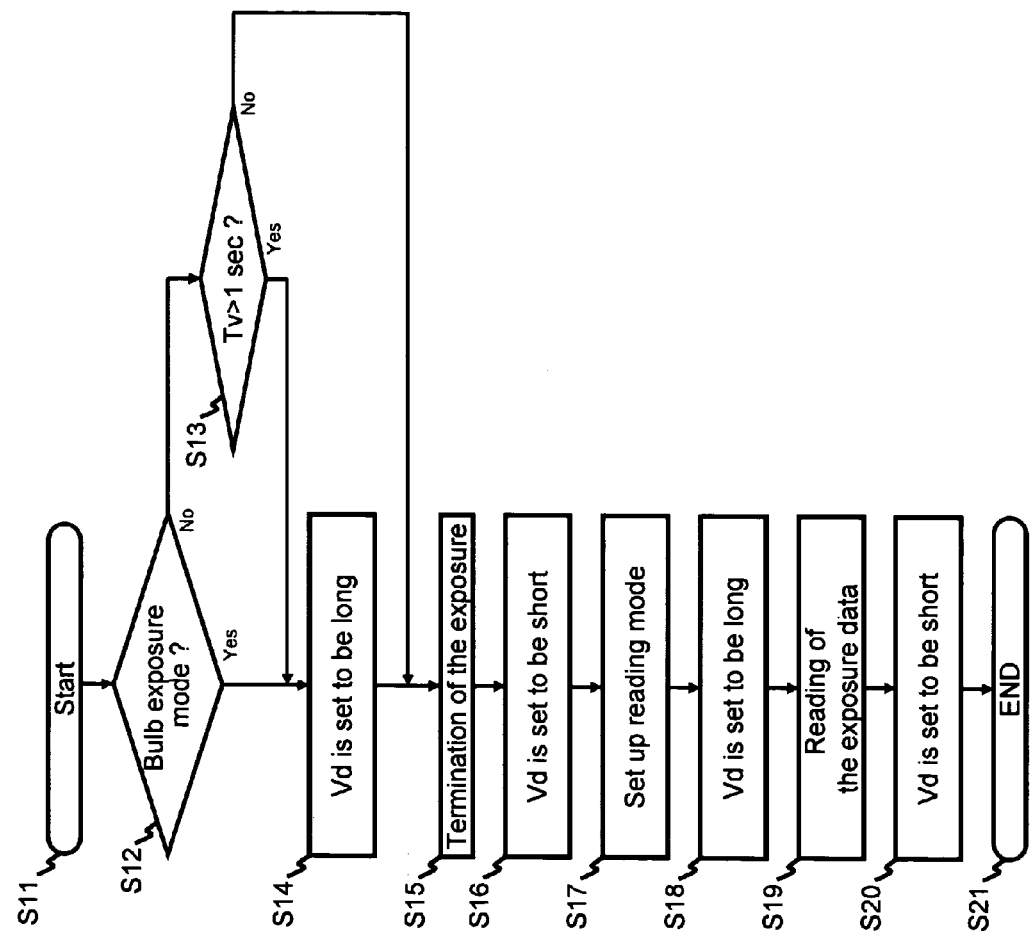
FIG. 2 is a flowchart showing the exposure operation.
Figure 3:
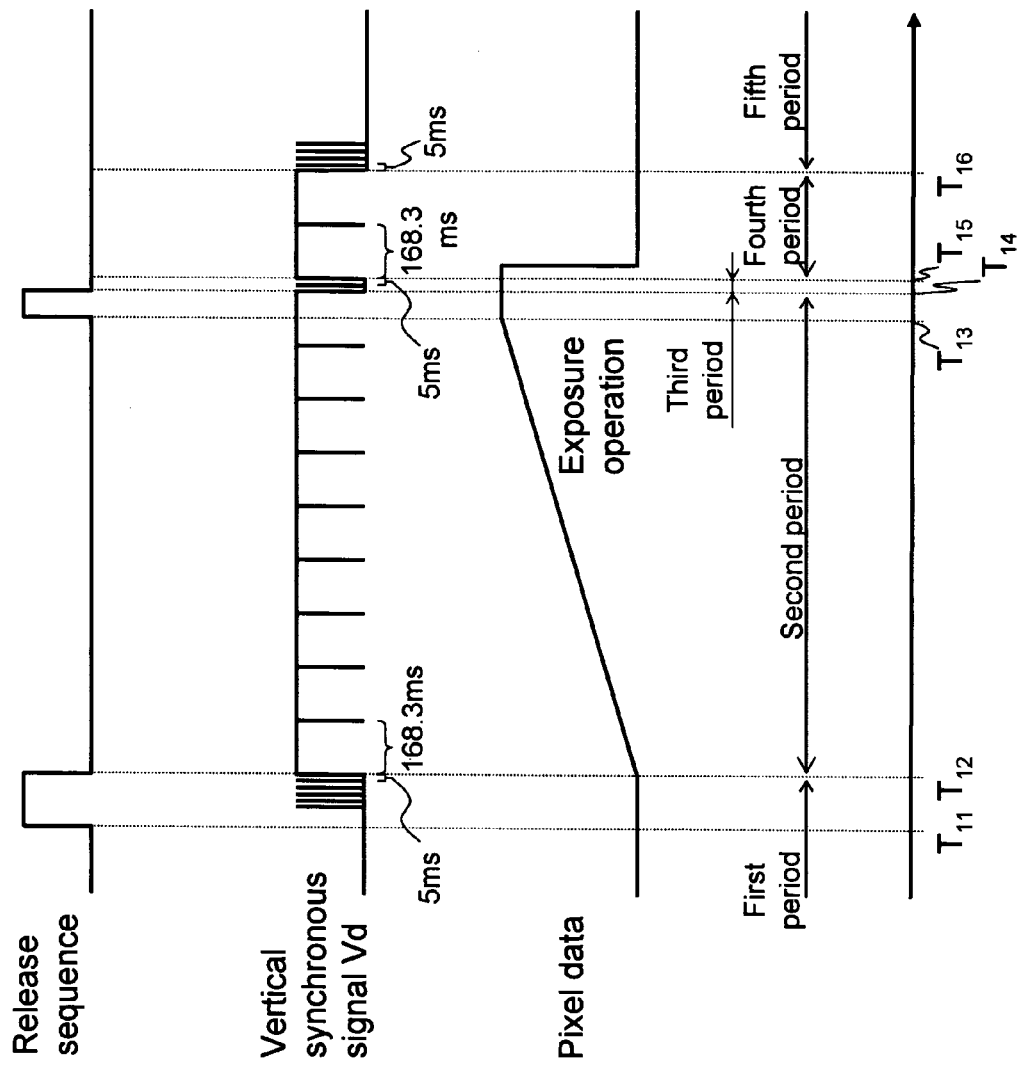
FIG. 3 is a timing chart showing the exposure operation.

Next, the change of the cycle of the vertical synchronous signal is explained (see FIGS. 2 to 3).

The horizontal axes of FIG. 3 represent time. FIG. 3 shows the timings where the vertical synchronous signal Vd is output and where pixel data accumulated by the CCD 33 during an exposure operation, is read in, corresponding to the pulse input (the release sequence) of the start and termination of the long time exposure operation.

The flowchart in FIG. 2 shows the exposure operation process of the CCD 33 run by the DSP 40 after the release switch (not depicted) is depressed.

When the release switch is in the on state ($T_{11}$ in FIG. 3), the first period is terminated and the exposure operation (the second period) is started ($T_{12}$ in FIG. 3) in step S11.

Before the exposure operation, the output cycle of the vertical synchronous signal Vd is set as the first cycle (5 ms). While the exposure operation is performed, the output cycle of the vertical synchronous signal Vd is set up the second cycle which can be either value of the two kinds of cycles 5 ms and 168.3 ms according to the time for the exposure operation.

In step S12, it is judged whether or not the digital camera 1 is in the bulb exposure mode, in other words the exposure operation is performed in the bulb exposure mode. When the digital camera 1 is in the bulb exposure mode, the exposure operation is continued while the release switch is in the on state (the second period). When the digital camera 1 is not in the bulb exposure mode, in step S13, it is judged whether or not the time for the exposure operation Tv, which is set in advance manually or automatically, is longer than 1 second.

When the digital camera 1 is in the bulb exposure mode, or the time for the exposure operation Tv is longer than 1 second, the output cycle of the vertical synchronous signal Vd is changed to long, in step S14, in other words, the second cycle is set to be long. Specifically, while the first cycle with which the vertical synchronous signal Vd is output before the exposure operation (until point $T_{12}$ in FIG. 3, the first period), is short (5 ms), the second cycle with which the vertical synchronous signal Vd is output while the exposure operation is performed ($T_{12}$~$T_{14}$ in FIG. 3, the second period), is changed to long (168.3 ms).

When the digital camera 1 is not in the bulb exposure mode, and the time for the exposure operation Tv is shorter than or equal to 1 second, the second cycle with which the vertical synchronous signal Vd is output, while the exposure operation is performed, is not changed to long, remaining the same (5 ms) as the first cycle with which the vertical synchronous signal Vd is output before the exposure operation, in other words, the second cycle is set to be short.

When the on state of the release switch is rescinded ($T_{13}$ in FIG. 3), or when the time passes, the time for the exposure operation Tv, which is set in advance manually or automatically ($T_{13}$ in FIG. 3) from the point $T_{12}$, the second period, which is the exposure operation, is terminated, in step S15. The output cycle of the vertical synchronous signal Vd is set as the third cycle which is short (5 ms), in step S16 ($T_{14}$ in FIG. 3).

Specifically, when the digital camera 1 is in the bulb exposure mode, or the time for the exposure operation Tv is longer than 1 second, the output cycle of the vertical synchronous signal Vd is changed from long (168.3 ms) to short (5 ms), and when the digital camera 1 is not in the bulb exposure mode, and the time for the exposure operation Tv is shorter than or equal to 1 second, the output cycle of the vertical synchronous signal Vd remains the same (5 ms) as the first cycle.

The exposure operation is continued under the condition where the CCD 33 is shaded, until the time when the vertical synchronous signal is output ($T_{14}$ in FIG. 3) immediately after the on state of the release switch is rescinded ($T_{13}$ in FIG. 3). Accordingly, strictly, the time for the exposure operation is from point $T_{12}$ to point $T_{14}$, however actually the time for the exposure operation is from point $T_{12}$ to point $T_{13}$.

The operation mode of the AFE 36 is changed from a first mode for the exposure operation, to a second mode for the reading of the data obtained in the exposure operation, in step S17.

The first mode for the exposure operation of the AFE 36 is the operation mode where electric charge signals, which occur in the imaging device, due to light striking the light-receiving surface of the imaging device and forming the electric charge, are accumulated.

The second mode for reading of the data obtained in the exposure operation of the AFE 36 is the operation mode where accumulated electric charge is transferred from a receiving-unit in the imaging device to a transferring-unit in the imaging device; the transferring-unit is driven by the transferring-drive pulse signals (not depicted); and the electric charge from the imaging device is gradually read.

After the operation mode of the AFE 36 is changed to the second mode for reading of the data obtained in the exposure operation ($T_{15}$ in FIG. 3), the third period is terminated, so that the output cycle of the vertical synchronous signal Vd is set as the fourth cycle which is long (168.3 ms), again, in step S18. Specifically, while the third cycle with which the vertical synchronous signal Vd is output between point $T_{14}$ and point $T_{15}$ (the third period), is 5 ms, the fourth cycle with which the vertical synchronous signal Vd is output between point $T_{15}$ and point $T_{16}$ (the fourth period), is changed to 168.3 ms.

In step S19, the reading of the data obtained in the exposure operation is carried out for every field ($T_{15}$ in FIG. 3). The reading of the data obtained in the exposure operation in the first field is carried out from point $T_{15}$ for 168.3 ms, and then the reading of the data obtained in the exposure operation in the second field is carried out from a point which is 168.3 ms passed point $T_{15}$ in FIG. 3, for 168.3 ms.

After the reading of the data obtained in the exposure operation in the second field is terminated ($T_{16}$ in FIG. 3), the fourth period is terminated, so that the output cycle of the vertical synchronous signal Vd is set as the fifth cycle which is short (5 ms), again, in step S20. Specifically, while the fourth cycle with which the vertical synchronous signal Vd is output between point $T_{15}$ and point $T_{16}$ (the fourth period), is 168.3 ms, the fifth cycle with which the vertical synchronous signal Vd is output after point $T_{16}$ (the fifth period), is changed to 5 ms. The fifth cycle is the same as the first cycle. In step S21, the flow of the one exposure operation is terminated.

The vertical synchronous signal is output with a short cycle which is 5 ms etc. for example, in a digital camera which is well known, except for while the reading of the data obtained in the exposure operation is performed (between point $T_{15}$ and point $T_{16}$ in FIG. 3 for example), because the response speed corresponding to the setting of the AFE 36 etc. should be high, and because the image which is indicated should be changed with a proper timing for the through image. Accordingly, the vertical synchronous signal is output with a short cycle which might be 5 ms etc. for example, in a digital camera of the prior art, while the exposure operation is performed (between point $T_{12}$ and point $T_{14}$ for example).

A high-speed signal is output in the first part of the vertical synchronous signal Vd, when the vertical synchronous signal is output from the AFE 36, in order to sweep the excessive data in the vertical transferring-path of the CCD 33. This high-speed signal is output every time when the vertical synchronous signal Vd is output. The outputting this high-speed signal causes a rise in temperature of the CCD 33. When the time for the exposure operation Tv is short (shorter than or equal to 1 second for example), there is little temperature rise of the CCD 33 due to the high-speed signals, because not many of these high-speed signals are output. However, when the time for the exposure operation Tv is long, the degree of the temperature rise of the CCD 33 is significant, because a large number of high-speed signals are output. The temperature rise of the CCD 33 causes the dark current, hence causes the noise.

However, because the noise restraint apparatus in this embodiment, makes the output cycle of the vertical sy2nchronous signal Vd (the second cycle) longer in comparison with prior art, not so many vertical synchronous signals Vd are output, even in a long time exposure operation. Accordingly, not so many high-speed signals corresponding to the vertical synchronous signal Vd are output, so that it becomes possible to resolve one of the factors causing the temperature rise of the CCD 33. Because the through image need not be indicated while the exposure operation is performed, the performance of the digital camera is not adversely influenced even if the output cycle of the vertical synchronous signal is set to be long while the exposure operation is performed.

The second cycle is set to be the same as the fourth cycle, accordingly, only two kinds of output cycles of the pulse signal, output by the AFE 36 in order to output the vertical synchronous signal Vd, are set up in the digital camera 1. However, the second cycle may not be set to be the same as the fourth cycle. For example, the second cycle may be set to be longer than the fourth cycle, and then it becomes possible to reduce the number of vertical synchronous signals Vd output in the exposure operation.

Furthermore, in this embodiment, it is judged whether or not the time for the exposure operation Tv is longer than 1 second, in step 13, however, the length of the comparative time is not limited to 1 second.

The digital camera in this embodiment is a single-lens reflex camera, however the digital camera is not limited to this.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-308358 (filed on Sep. 1, 2003), which is expressly incorporated herein by reference, in its entirety.

The invention claimed is:

1. A noise restraint apparatus for a digital camera which has an imaging device for imaging a photographic subject, comprising:
   an outputting processor that outputs a vertical synchronous signal to said imaging device; and
   a controlling processor that controls an output cycle of said vertical synchronous signal;
   said output cycle set to a first cycle, for a first period which is the period before an exposure operation, in which a photographic subject is imaged by said imaging device, a second cycle which is longer than said first cycle, for a second period, while said exposure operation is performed, a third cycle which is shorter than said second cycle, for a third period which is the period where an operation mode of said imaging device is changed from a first mode for said exposure operation to a second mode for reading of data obtained in said exposure operation, after said exposure operation is terminated, and a fourth cycle which is longer than said third cycle, for a fourth period which is the period where said data obtained in said exposure operation is read from said imaging device for every field, after changing to said second mode.

2. The noise restraint apparatus according to claim 1, further comprising:
   an exposure time judging processor that judges whether a time for said exposure operation is longer than a specified time;
   said outputting processor outputting said vertical synchronous signal with said second cycle while said exposure operation is performed, in accordance with a control signal output by said controlling processor, when it is judged that said time for said exposure operation is longer than said specified time by said exposure time judging processor.

3. The noise restraint apparatus according to claim 1, wherein said second cycle is equal to the time for reading of data obtained in said exposure operation from said imaging device for one field, after the termination of said exposure operation.

4. The noise restraint apparatus according to claim 1, wherein said first cycle is 5 ms, and said second cycle is 168.3 ms.

5. A method for restraining noise in a digital camera which has an imaging device for imaging a photographic subject, comprising:
   outputting a vertical synchronous signal at a first cycle for a first period which is a period before an exposure operation in which a photographic subject is imaged by said imaging device;
   outputting said vertical synchronous signal at a second cycle for a second period which is a period while said exposure operation is performed, wherein said second cycle is longer than said first cycle;
   terminating said exposure operation by outputting said vertical synchronous signal after a time for said exposure operation has passed;
   outputting said vertical synchronous signal at a third cycle for a third period which is a period during the period where an operation mode of said imaging device is changed from a first mode for said exposure operation to a second mode for reading of data obtained in said exposure operation, after said exposure operation is terminated, wherein said third cycle is shorter than said second cycle; and
   outputting said vertical synchronous signal at a fourth cycle for a fourth period which is a period during the period where said data obtained in said exposure operation is read from said imaging device for every field, after changing to said second mode, wherein said fourth cycle is longer than said third cycle.

6. The method for restraining noise according to claim 5, wherein after setting said fourth cycle, said vertical synchronous signal is output with said first cycle.

7. The method for restraining noise according to claim 5, wherein said second cycle and said fourth cycle are the same.

8. The method for restraining noise according to claim 7, wherein said second cycle is equal to the time for reading of data in said exposure operation from said imaging device, for one field.

9. The method for restraining noise according to claim 8, wherein said second cycle and said fourth cycle are 168.3 ms.

10. The method for restraining noise according to claim 5, wherein said first cycle, and said third cycle are the same.

11. The method for restraining noise according to claim 10, wherein said first cycle, and said third cycle are 5 ms.

12. The method for restraining noise according to claim 5, wherein a time for said exposure operation is longer than a specified time.

13. The method for restraining noise according to claim 5, wherein said exposure operation is performed in the bulb exposure mode.

* * * * *